(12) United States Patent
Poster et al.

(10) Patent No.: US 10,145,464 B2
(45) Date of Patent: Dec. 4, 2018

(54) GEARBOX WITH PASSIVE LUBRICATION SYSTEM

(71) Applicant: TEXTRON INNOVATIONS INC., Providence, RI (US)

(72) Inventors: Scott D. Poster, Arlington, TX (US); David A. Elliott, Azle, TX (US); Gary A. Cope, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 15/285,232

(22) Filed: Oct. 4, 2016

(65) Prior Publication Data

US 2017/0241539 A1 Aug. 24, 2017

Related U.S. Application Data

(63) Continuation of application No. 13/426,789, filed on Mar. 22, 2012, now Pat. No. 9,458,923.

(Continued)

(51) Int. Cl.
*F16H 57/04* (2010.01)
*F16H 57/027* (2012.01)
(Continued)

(52) U.S. Cl.
CPC ......... *F16H 57/0447* (2013.01); *B64C 27/06* (2013.01); *B64C 27/12* (2013.01);
(Continued)

(58) Field of Classification Search
CPC ............ F16H 57/0447; F16H 57/0424; F16H 57/0438; F16H 57/045; F16H 57/0471;
(Continued)

(56) References Cited

U.S. PATENT DOCUMENTS 1,086,663 A   2/1914   Gould et al.
1,743,966 A * 1/1930   Goudard .................. F02M 1/00
                                                            137/576

(Continued)

FOREIGN PATENT DOCUMENTS

AT       162792 B    4/1949
EP      2725262 A    4/2014
(Continued)

OTHER PUBLICATIONS

Extended European Search Report dated Jul. 17, 2012 from related EP App. No. 12161890.4, 11 pages.

(Continued)

*Primary Examiner* — Michael A Riegelman
(74) *Attorney, Agent, or Firm* — James E. Walton

(57) ABSTRACT

A lubrication system includes a reserve housing configured to retain a lubrication fluid. A supply line in fluid communication with the reserve housing is configured to provide pressurized lubrication fluid to the reserve housing. An overflow tube has an overflow port, the overflow tube being configured to prevent the volume of the lubrication fluid from exceeding a certain amount. A metering jet is configured to allow the lubrication fluid to flow from the reserve housing onto a component, such as a bearing, in the gearbox at a predetermined rate. The metering jet provides flow of the lubrication fluid onto the bearing even when the supply line no longer provides pressurized lubrication fluid to the reserve housing.

20 Claims, 3 Drawing Sheets

Related U.S. Application Data

(60) Provisional application No. 61/469,838, filed on Mar. 31, 2011.

(51) Int. Cl.
| | | |
|---|---|---|
| *B64C 27/12* | (2006.01) | |
| *B64D 35/00* | (2006.01) | |
| *B64C 27/06* | (2006.01) | |
| *B64C 27/82* | (2006.01) | |

(52) U.S. Cl.
CPC .............. *B64C 27/82* (2013.01); *B64D 35/00* (2013.01); *F16H 57/027* (2013.01); *F16H 57/045* (2013.01); *F16H 57/0424* (2013.01); *F16H 57/0438* (2013.01); *F16H 57/0442* (2013.01); *F16H 57/0471* (2013.01)

(58) Field of Classification Search
CPC ......... B64C 27/06; B64C 27/12; B64C 27/82; B64D 35/00
See application file for complete search history.

(56) References Cited

U.S. PATENT DOCUMENTS

| | | | |
|---|---|---|---|
| 2,056,434 A | 10/1936 | Muller | |
| 2,617,495 A | 11/1952 | Johnson | |
| 2,988,154 A | 6/1961 | Hub | |
| 3,326,264 A * | 6/1967 | Howard | B60K 15/06 137/398 |
| 3,656,657 A | 4/1972 | Smith et al. | |
| 3,662,858 A | 5/1972 | Peterson | |
| 4,271,928 A | 6/1981 | Northern | |
| 4,329,952 A | 5/1982 | Buraas | |
| 5,121,815 A * | 6/1992 | Francois | B64C 27/12 184/6.12 |
| 5,176,174 A * | 1/1993 | Toraason | G05D 9/02 137/590 |
| 6,131,834 A | 10/2000 | Teeter | |
| 6,793,042 B2 | 9/2004 | Brouillet | |
| 7,367,427 B2 | 5/2008 | Gaines et al. | |
| 7,651,049 B2 | 1/2010 | Carnelli | |
| 7,882,932 B2 | 2/2011 | Regonin | |
| 8,020,665 B2 * | 9/2011 | Sheridan | F01D 25/18 184/6.12 |
| 8,292,036 B2 | 10/2012 | Nishida | |
| 8,459,413 B2 | 6/2013 | Gmirya et al. | |
| 2002/0007982 A1 | 1/2002 | Howard | |
| 2005/0274349 A1 | 12/2005 | Lee | |
| 2008/0116010 A1 * | 5/2008 | Portlock | F01D 25/18 184/6.12 |
| 2009/0101441 A1 | 4/2009 | Nishida | |
| 2011/0048856 A1 * | 3/2011 | Thivierge | F01D 25/20 184/6.11 |
| 2012/0247874 A1 * | 10/2012 | Poster | F16H 57/027 184/6.12 |
| 2014/0076661 A1 * | 3/2014 | Xu | F16N 17/06 184/6 |

FOREIGN PATENT DOCUMENTS

| | | |
|---|---|---|
| GB | 101528 | 9/1916 |
| WO | 2008045112 A2 | 4/2008 |

OTHER PUBLICATIONS

Examination Report dated Dec. 31, 2013, in related CA App. No. 2,772,754, 2 pages.
Office Action dated Nov. 27, 2014 from counterpart CN App. 201210089055.5.
Office Action dated Jul. 15, 2015 from counterpart CN App. No. 201210089055.5.
Office Action dated Aug. 16, 2013 in related U.S. Appl. No. 13/426,789, 12 pages.
Office Action Response dated Nov. 18, 2013 in related U.S. Appl. No. 13/426,789, 13 pages.
Office Action dated Dec. 19, 2013 in related U.S. Appl. No. 13/426,789, 11 pages.
Office Action Response dated Feb. 19, 2014 in related U.S. Appl. No. 13/426,789, 10 pages.
Office Action dated May 6, 2014 in related U.S. Appl. No. 13/426,789, 10 pages.
Office Action Response dated Jul. 29, 2014 in related U.S. Appl. No. 13/426,789, 10 pages.
Office Action dated Oct. 3, 2014 in related U.S. Appl. No. 13/426,789, 11 pages.
Office Action Response dated Jan. 5, 2015 in related U.S. Appl. No. 13/426,789, 11 pages.
Office Action dated Feb. 12, 2015 in related U.S. Appl. No. 13/426,789, 11 pages.
Office Action Response dated May 12, 2015 in related U.S. Appl. No. 13/426,789, 10 pages.
Office Action dated Jun. 25, 2015 in related U.S. Appl. No. 13/426,789, 13 pages.
Office Action Response dated Aug. 25, 2015 in related U.S. Appl. No. 13/426,789, 11 pages.
Office Action dated Oct. 27, 2015 in related U.S. Appl. No. 13/426,789, 13 pages.
Office Action Response dated Jan. 27, 2016 in related U.S. Appl. No. 13/426,789, 13 pages.
Office Action dated Sep. 1, 2014 from related EP App. No. 13150077.9, 4 pages.
Examination Report dated Jul. 11, 2018 from corresponding Indian patent application No. 898/DEL/2012.

* cited by examiner

GEARBOX WITH PASSIVE LUBRICATION SYSTEM

CROSS REFERENCE TO RELATED APPLICATIONS

This application is a continuation of U.S. patent application Ser. No. 13/426,789, filed 22 Mar. 2012, titled "Gearbox with Passive Lubrication System," which issued as U.S. Pat. No. 9,458,923 on 4 Oct. 2016, which claims the benefit of U.S. Provisional Application No. 61/469,838, filed 31 Mar. 2011, titled "Gearbox with Passive Lubrication System," all of which are hereby incorporated by reference for all purposes as if fully set forth herein.

BACKGROUND

Technical Field:

The present application relates to a passive lubrication system that is configured to provide lubrication in a gearbox during a loss of lubrication event.

Description of Related Art:

Typically, a rotorcraft gearbox is required to have the capability to operate for a specific period of time during which the primary lubrication pressure system has malfunctioned. One typical solution is for the gearbox lubrication system to include a primary lubrication system and a completely redundant lubrication system. The redundant lubrication system is activated upon failure of the primary lubrication system. Having a completely redundant lubrication system adds considerable weight, complexity, and cost to the rotorcraft.

Hence, there is a need for an improved gearbox lubrication system.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application includes a passive lubrication system that is configured to provide continual lubrication to gearbox components for a period of time during a "run dry" or emergency condition. A "run dry" condition can exist when the primary pressurized lubrication supply has been terminated through a system malfunction, battle damage, or the like. During the run dry scenario, the passive lubrication system of the present application provides continued lubrication to gearbox components without active command.

Figure 1:
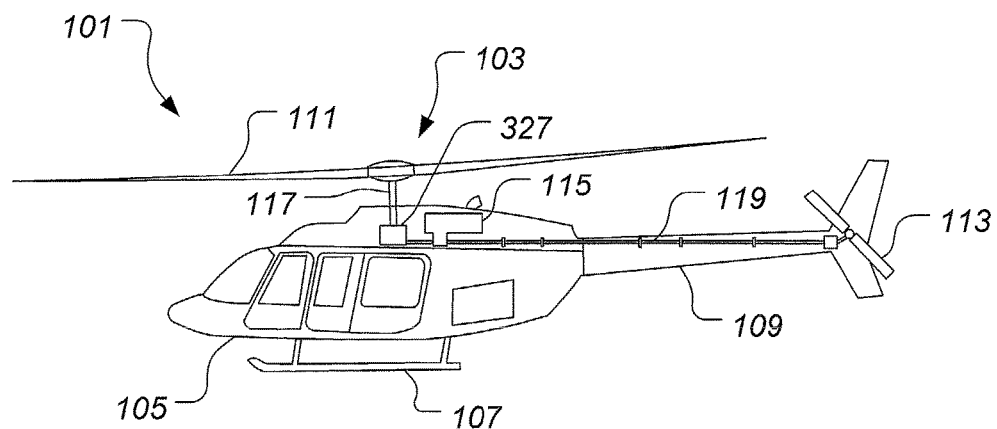
FIG. 1 is a schematic side view of a rotorcraft, according to an illustrative embodiment of the present application.
Figure 2:
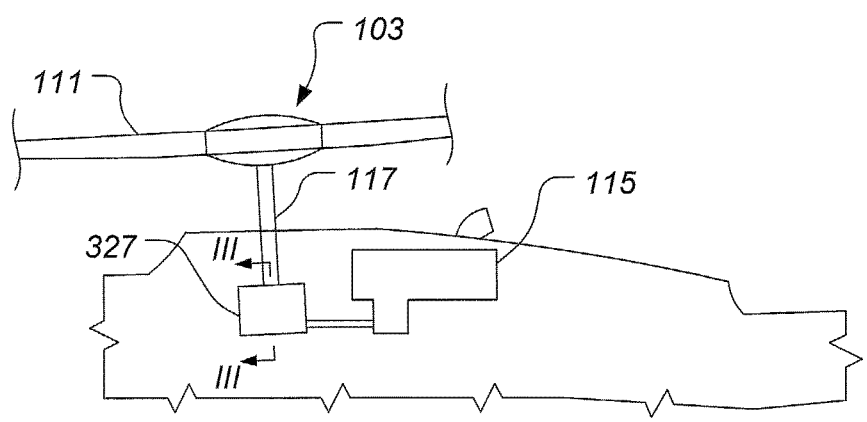
FIG. 2 is a partial schematic side view of the rotorcraft of FIG. 1, according to an illustrative embodiment of the present application.

Referring to FIGS. 1 and 2 in the drawings, a rotorcraft 101 is illustrated. Rotorcraft 101 has a rotor system 103 with a plurality of main rotor blades 111. Rotorcraft 101 further includes a fuselage 105, landing gear 107, a tail member 109, and tail rotor blades 113. An engine 115 supplies torque to a main rotor mast 117 via a gearbox 327 for the rotating of main rotor blades 111. Engine 115 also supplies torque to a tail rotor drive shaft 119 for the rotating of tail rotor blades 113. The pitch of each main rotor blade 111 can be selectively controlled in order to selectively control direction, thrust, and lift of rotorcraft 101. Further, the pitch of tail rotor blades 113 can be selectively controlled in order to selectively control yaw of rotorcraft 101. Rotorcraft 101 is illustrated for exemplary purposes only. It should be appreciated that the system of the present application may be used on aircraft other than rotorcraft, such as airplanes, tilt rotors, unmanned aircraft, to name a few examples. Further, the system of the present application may be used on non-aircraft vehicles and implementations.

Figure 3:
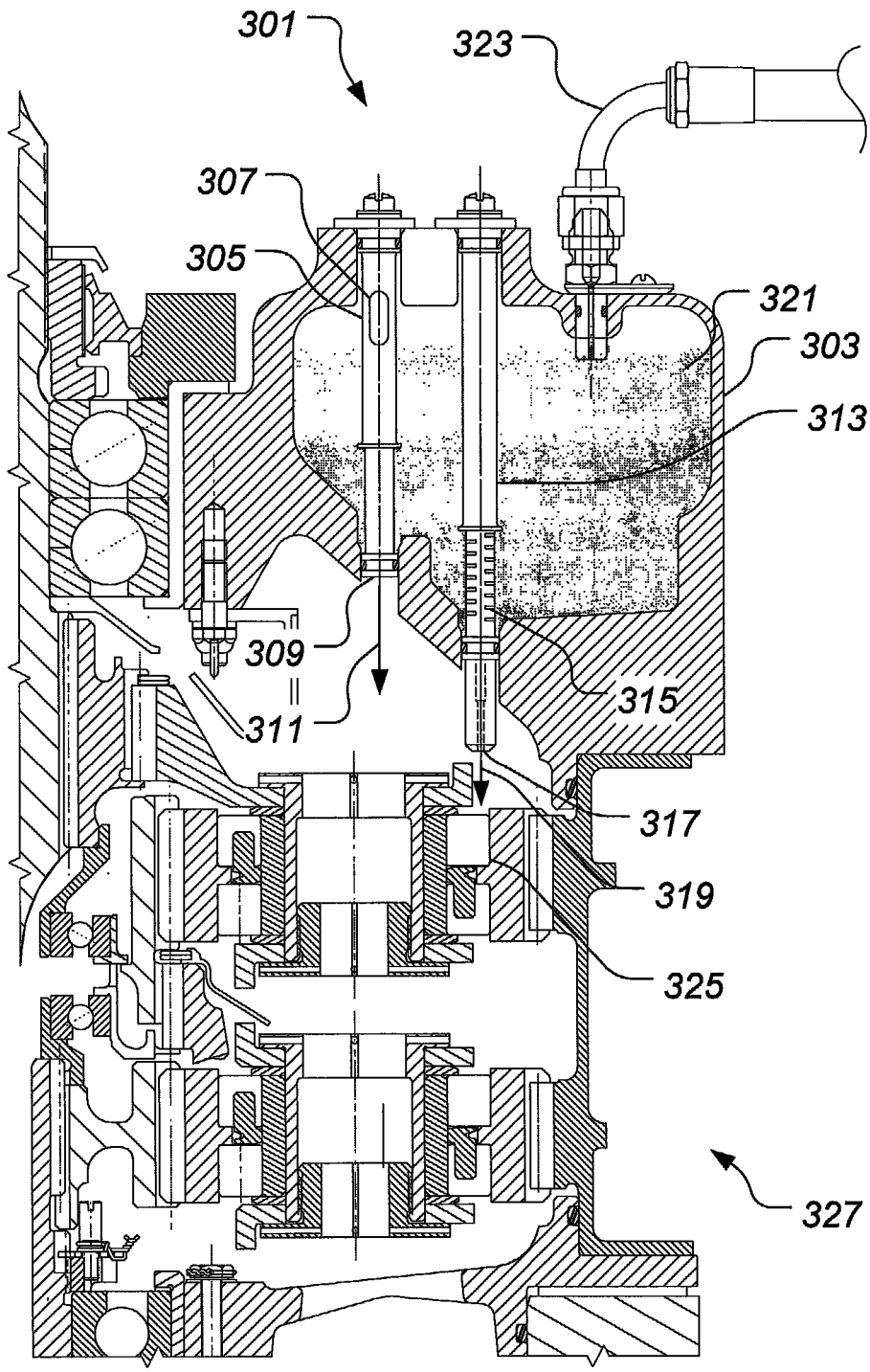
FIG. 3 is a partial cross-sectional view of a gearbox, taken at section lines III-III in FIG. 2, according to the preferred embodiment of the present application.

Referring now also to FIG. 3, a passive lubrication system 301 is illustrated in conjunction with gearbox 327. In the illustrated embodiment, gearbox 327 is depicted as a gearbox on rotorcraft 101; however, it should be appreciated the system 301 may be equally implemented on a variety of vehicles and structures having gearboxes that require lubrication. Gearbox 327 functions to convert high speed rotation of an output drive shaft of engine 115 into low speed rotation of main rotor mast 117. Gearbox 327 includes a plurality of gears and bearings that require lubrication to properly function.

Lubrication of gearbox 327 is essential to the operation of rotorcraft 101. Rotorcraft regulatory agencies, such as the Federal Aviation Administration (FAA) may require that gearbox 327 be operable for a requisite period of time after the primary pressurized lubrication system has failed. Such a requirement in a rotorcraft gearbox may be referred to as "run dry" capability requirement.

System 301 includes a reserve housing 303 configured to contain a certain volume of lubrication fluid 321. Reserve housing 303 is preferably cast or machined such that reserve housing 303 is a structural member capably of carrying loads. In such an embodiment, reserve housing 303 is integral with the gearbox housing such that the gearbox housing and the reserve housing 303 are a single cast or machined structure. Reserve housing 303 can alternatively be a separate unit from the gearbox housing, such that reserve housing 303 can be attached to the gearbox housing with one or more fasteners and seals, for example. A lubrication fluid supply line 323 provides pressured lubrication fluid to the interior of reserve housing 303 during normal operating conditions. Furthermore, the pressurized primary lubrication system that provides pressurized lubrication fluid to lubrication fluid supply line 323 can be configured to provide lubrication to the interior of the gearbox in other locations as well.

System 301 preferably further includes an overflow tube 305 having an overflow entry port 307. Overflow tube 305 is at least partly configured to prevent the volume of lubrication fluid 321 within reserve housing 303 to exceed a predefined level dictated by the location of overflow entry port 307. During normal operation, lubrication fluid supply line 323 continuously provides pressurized lubrication fluid 321 to the interior of housing 303. As such, lubrication fluid 321 enters overflow entry port 307 and is gravity fed down through the interior of overflow tube 305 and through an overflow exit port 309, along an overflow direction 311 into gearbox 327. Overflow tube 305 can include a filter or screen for removing any undesired contamination from lubrication fluid 321. Overflow tube 305 is preferably removable, via a fastener, in order to facilitate inspection and maintenance. One or more seals can be used to prevent leakage of lubrication fluid 321 between overflow tube 305 and reserve housing 303. Overflow tube 305 is also configured to act as a vent to allow air to flow to/from the interior of reserve housing 303 to/from the interior of gearbox 327. For example, air can flow through overflow tube 305 when supply line 323 fills reserve housing 303. Similarly, air can flow into reserve housing 321 when lubrication fluid 321 drains out through metering jet 313 so as to prevent a vacuum from forming therein.

It should be appreciated that supply line 323 can include a check valve in order to prevent lubrication fluid 321 from flowing back down supply line 323. In an alternative embodiment, supply line 323 is located on a side portion of reserve housing 103, which can cause a check valve in supply line 323, or other means of preventing reverse flow of lubrication fluid 321, to be particularly desirable.

System 301 preferably also includes a metering jet 313. In the illustrated embodiment, metering jet 313 includes a plurality of metering jet orifices 315. Orifices 315 are configured to receive lubrication fluid 321, which is gravity fed through a metering jet exit port 317. Flow of lubrication fluid 321 is metered through metering jet 313 between orifices 315 and exit port 317 along a direction 319, and onto a bearing 325. Metering jet 313 preferably includes a filter or screen for removing any undesired contamination from lubrication fluid 321. Metering jet 313 is preferably removable, via a fastener, in order to facilitate inspection and maintenance. One or more seals can be used to prevent leakage of lubrication fluid 321 between metering jet 313 and reserve housing 303.

During a loss of lubrication situation, the lubrication supply from supply line 323 can cease to supply lubrication fluid 321 to housing 303. Even though lubrication fluid 321 is not being pressure fed into housing 303, system 301 is configured to continuously supply lubrication fluid 321 to bearing 325 until reserve housing 303 is emptied of lubrication fluid 321. Reserve housing 303, orifices 315, and exit port 317 are all configured so the lubrication fluid 321 is metered and allowed to flow onto bearing 325 for a requisite period of time. For example, the requisite period of time may be thirty minutes. The requisite period of time allows the pilot of the rotorcraft to safely land while the gearbox 327 is operable.

System 301 is configured to be passive in that it operates to provide lubrication fluid 321 to bearing 325 during a loss of lubrication situation without requiring an affirmative command from separate entity, such as pilot or detection system. Further, system 301 is configured to passively provide lubrication fluid 321 to one or more bearings 325 for a period of time so as to satisfy a "run dry" requirement.

System 301 is also configured such that the lubrication fluid 321 in reserve housing 303 is continuously heated, circulated, and filtered during normal operating conditions. More specifically, normal operating conditions allow for the continuous introduction of lubrication fluid 321 into reserve housing 303 via supply line 323, as well as the continuous flow of lubrication fluid 321 from reserve housing 303 into gearbox 327 through overflow exit port 309 and metering jet exit port 317. The continual exchange of lubrication fluid 321 in reserve housing 303 insures that lubrication fluid 321 is in condition for use upon failure of the primary pressurized lubrication system.

Even though system 301 is illustrated as having only one overflow tube 305 and one metering jet 313, it should be appreciated that system 301 may include a plurality of overflow tubes 305 and metering jets 313. For example, each metering jet 313 may be strategically located above critical bearings which need lubrication fluid 321 for operation of gearbox 327. It should be appreciated that the bearings receiving lubrication fluid 321 via metering jet 313 may also be gears, or any other type of moving part that may require lubrication to minimize friction.

Figures 4A, 4B:
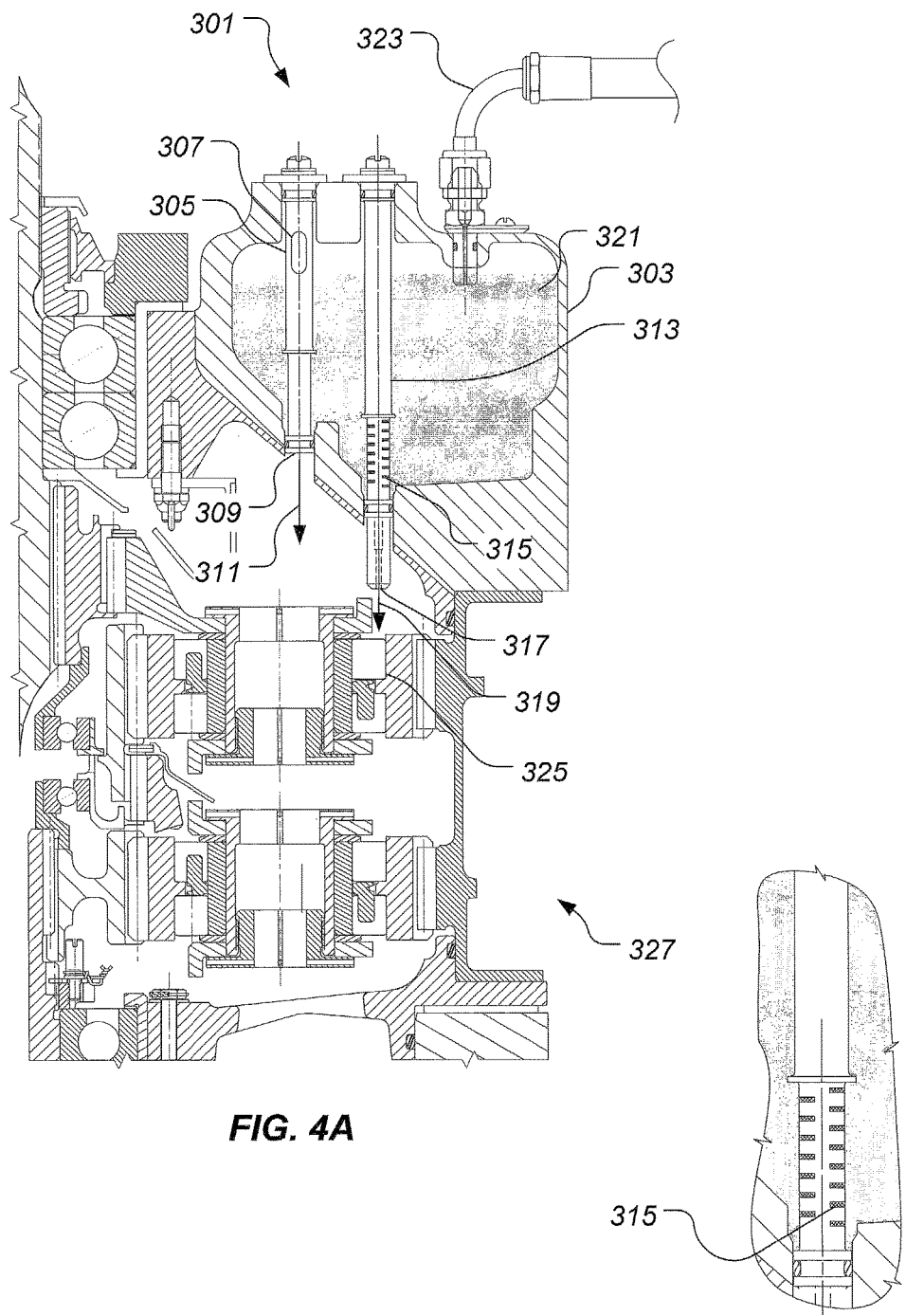
FIG. 4A is a partial cross-sectional view of a gearbox, according to an alternative embodiment of the present application.
FIG. 4B is an enlarged view of a portion of the partial cross-sectional view of the gearbox from FIG. 4A.

Referring now also to FIGS. 4A and 4B in the drawings. As shown in FIG. 4A the reserve housing 303 is a separate unit from the gearbox housing. As shown in FIG. 4B the metering jet 313 preferably includes a filter or screen for removing any undesired contamination from lubrication fluid 321.

The passive lubrication system 301 provides significant advantages, including: 1) passively lubricating the gearbox during a failure of a primary pressurized lubrication system; and 2) providing heated, filtered, and circulated lubrication fluid that is available during the failure of a primary pressurized lubrication system.

It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A lubrication system for a gearbox, the lubrication system comprising:
   a reserve housing configured to retain a lubrication fluid;
   a supply line in fluid communication with the reserve housing, the supply line configured to provide pressurized lubrication fluid directly to the reserve housing;

an overflow tube directly coupled between the reserve housing and the gearbox, the overflow tube having an overflow entry port and an overflow exit port, the overflow tube being configured to prevent a volume of the lubrication fluid in the reserve housing from exceeding a predefined level; and a metering jet configured to allow the lubrication fluid to flow from the reserve housing onto a component in the gearbox at a predetermined rate;

wherein the reserve housing is closed to atmospheric conditions;

wherein the overflow exit port is located below the overflow entry port;

wherein the overflow exit port is configured to allow the lubrication fluid to flow from the reserve housing directly into the gearbox; and wherein the metering jet provides flow of the lubrication fluid onto the component for a period of time subsequent to a cessation of flow of the lubrication from the supply line to the reserve housing.

2. The lubrication system according to claim 1, wherein the reserve housing is integral with a gearbox housing.

3. The lubrication system according to claim 1, wherein the reserve housing is a separate member attached to a gearbox housing.

4. The lubrication system according to claim 1, wherein the metering jet is retained in the gearbox housing by a fastener.

5. The lubrication system according to claim 4, wherein the overflow tube is removable from the reserve housing.

6. The lubrication system according to claim 1, wherein the metering jet includes a plurality of orifices configured to allow the lubrication fluid to enter an interior of the metering jet.

7. The lubrication system according to claim 1, wherein the metering jet includes an exit port on a lower portion of the metering jet, the exit port being configured to allow the lubrication fluid to exit the metering jet.

8. The lubrication system according to claim 1, wherein the metering jet is removable from the reserve housing.

9. The lubrication system according to claim 1, wherein the component is at least one of:
a bearing; and
a gear.

10. The lubrication system according to claim 1, wherein the supply line is associated with an upper portion of the reserve housing.

11. A gearbox for an aircraft, the gearbox comprising:
a gearbox housing for housing a plurality of components;
a reserve housing configured to retain a lubrication fluid, the reserve housing mounted to the gearbox housing;
a supply line in fluid communication with the reserve housing, the supply line configured to provide pressurized lubrication fluid directly to the reserve housing; and
a metering jet configured to allow the lubrication fluid to flow from the reserve housing onto at least one of the plurality of components in the gearbox at a predetermined rate;

wherein the reserve housing is closed to atmospheric conditions;

wherein the metering jet is retained in the gearbox housing by a fastener; and wherein the metering jet provides flow of the lubrication fluid onto a bearing for a period of time subsequent to a cessation of flow of the lubrication from the supply line to the reserve housing.

12. The gearbox according to claim 11, further comprising:
an overflow tube, the overflow tube being configured to prevent a volume of the lubrication fluid in the reserve housing from exceeding a certain amount.

13. The gearbox according to claim 12, further comprising:
a filter located in the overflow tube for removing contaminants from the lubrication fluid.

14. The gearbox according to claim 12, the overflow tube comprising an overflow exit port in fluid communication with an overflow port so that the lubrication fluid can flow from the overflow port, through an interior of the overflow tube, and out the overflow exit into the gearbox housing.

15. The gearbox according to claim 12, wherein the overflow tube is configured to act as a vent to allow air to exchange between the interior of the gearbox housing and the interior of the reserve housing.

16. The gearbox according to claim 11, wherein the metering jet is removable from the gearbox housing.

17. The gearbox according to claim 11, wherein the period of time corresponds with an amount of time that provides an operator of the aircraft sufficient time to land the aircraft.

18. The gearbox according to claim 11, wherein the plurality of components in the gearbox are moveable objects that require lubrication to minimize friction.

19. The gearbox according to claim 11, further comprising a filter to remove contaminants from the lubrication fluid.

20. The gearbox according to claim 19, wherein the filter is located in the metering jet.

* * * * *